United States Patent [19]
Ottesen et al.

[11] Patent Number: 6,097,559
[45] Date of Patent: Aug. 1, 2000

[54] SYSTEM AND METHOD FOR DETECTING HEAD-TO-DISK CONTACT IN-SITU A DIRECT ACCESS STORAGE DEVICE USING A POSITION ERROR SIGNAL

[75] Inventors: Hal Hjalmar Ottesen; Gordon James Smith, both of Rochester, Minn.

[73] Assignee: International Business Machines Corporation, Armonk, N.Y.

[21] Appl. No.: 09/105,368

[22] Filed: Jun. 26, 1998

[51] Int. Cl.$^7$ .............................. G11B 27/36; G11B 5/02; G11B 5/596
[52] U.S. Cl. ........................... 360/31; 360/25; 360/77.02
[58] Field of Search .................................. 360/25, 31, 53, 360/77.02, 77.08

[56] References Cited

U.S. PATENT DOCUMENTS

| | | | |
|---|---|---|---|
| 5,831,781 | 11/1998 | Okamura | 360/31 |
| 5,901,001 | 5/1999 | Meyer et al. | 360/25 |
| 6,008,640 | 12/1999 | Tan et al. | 360/31 |
| 6,014,282 | 1/2000 | Ito | 360/31 |

*Primary Examiner*—W. Chris Kim
*Attorney, Agent, or Firm*—Mark Hollingsworth

[57] ABSTRACT

An apparatus and method for detecting low flying read/write heads provides for the detection of contact between an air bearing slider/transducer assembly and a surface feature developed on a surface of a data storage disk. The apparatus includes a transducer disposed on an air bearing slider. An actuator is coupled to the slider/transducer assembly typically by employment of a head suspension assembly. The processor, in response to position error signals developed from servo information provided on the disk surface, moves the actuator and slider/transducer assembly to prescribed disk surface locations. The processor further processes non-repeatable position error signal values developed at a plurality of disk surface locations to detect an occurrence of contact between the slider/transducer assembly and a surface feature arising from the disk surface. Detecting the occurrence of a head-to-disk contact event generally involves acquiring position error signals from a first disk location and a second disk location using a particular transducer. The processor computes a power ratio value using a first power value and a second power value respectively derived from non-repeatable position error signals acquired from the first and second disk locations. The processor then compares the power ratio value with a power ratio threshold value, such that a power ratio value exceeding the power ratio threshold value indicates an occurrence of contact between the air bearing slider and a surface feature of the disk. The head-to-disk contact detection methodology of the present invention may be field upgradable in-situ a data storage system.

26 Claims, 13 Drawing Sheets

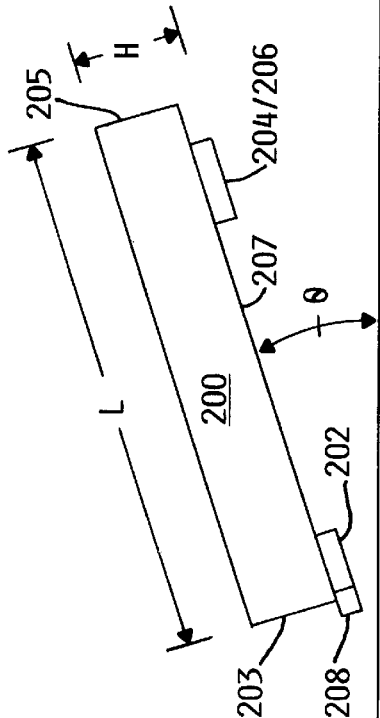
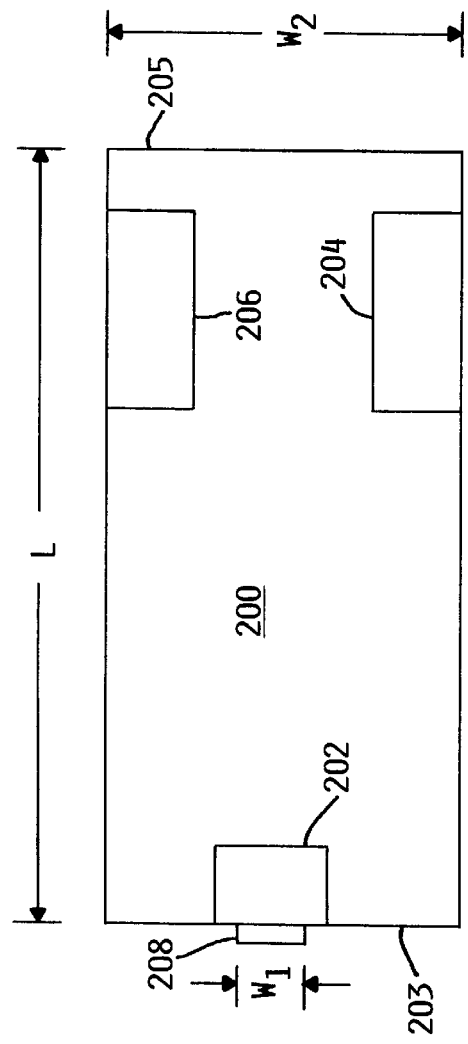
FIG. 4
FIG. 5

SYSTEM AND METHOD FOR DETECTING HEAD-TO-DISK CONTACT IN-SITU A DIRECT ACCESS STORAGE DEVICE USING A POSITION ERROR SIGNAL

FIELD OF THE INVENTION

The present invention relates generally to data storage systems and, more particularly, to a system and method for detecting low flying heads using the position error signal.

BACKGROUND OF THE INVENTION

A typical data storage system includes a magnetic medium for storing data in magnetic form and a transducer used to write and read magnetic data respectively to and from the medium. A typical disk storage device, for example, includes one or more data storage disks coaxially mounted on a hub of a spindle motor. The spindle motor rotates the disks at speeds typically on the order of several thousand revolutions-per-minute (RPM).

Digital information is typically stored in the form of magnetic transitions on a series of concentric, spaced tracks formatted on the surface of the magnetizable rigid data storage disks. The tracks are generally divided into a number of sectors, with each sector comprising a number of information fields, including fields for storing data, and sector identification and synchronization information, for example.

An actuator assembly typically includes a plurality of outwardly extending arms with one or more transducers and slider bodies being mounted on flexible suspensions. The slider body lifts the transducer head off the surface of the disk as the rate of spindle motor rotation increases, and causes the head to hover above the disk on an air bearing produced by high speed disk rotation. The distance between the head and the disk surface, which is typically on the order of 40–100 nanometers (nm), is commonly referred to as head-to-disk clearance or spacing.

Writing data to a magnetic data storage disk generally involves passing a current through the write element of the transducer assembly to produce magnetic lines of flux which magnetize a specific location of the disk surface. Reading data from a specified disk location is typically accomplished by a read element of the transducer assembly sensing the magnetic field or flux lines emanating from the magnetized locations of the disk. As the read element passes over the rotating disk surface, the interaction between the read element and the magnetized locations on the disk surface results in the production of electrical signals, commonly referred to as readback signals, in the read element.

Conventional data storage systems generally employ a closed-loop servo control system for positioning the read/write transducers to specified storage locations on the data storage disk. During normal data storage system operation, a servo transducer, generally mounted proximate the read/write transducers, or, alternatively, incorporated as the read element of the transducer, is typically employed to read information for the purpose of following a specified track (i.e., track following) and locating (i.e., seeking) specified track and data sector locations on the disk.

In accordance with one known servo technique, embedded servo pattern information is written to the disk along segments extending in a direction generally outward from the center of the disk. The embedded servo patterns are thus formed between the data storing sectors of each track. It is noted that a servo sector typically contains a pattern of data, often termed a servo burst pattern, used to maintain optimum alignment of the read/write transducers over the centerline of a track when transferring data to and from specified data sectors on the track. The servo information may also include sector and track identification codes which are used to identify the location of the transducer.

Within the data storage system manufacturing industry, much attention is presently being focused on reducing head-to-disk clearance as part of the effort to increase the storage capacity of data storage disks. It is generally desirable to reduce the head-to-disk clearance in order to increase the readback signal sensitivity of the transducer to typically weaker magnetic transitions associated with higher density disks. When decreasing the transducer-to-disk clearance, however, the probability of detrimental contact between the sensitive transducer and an obstruction on the disk surface significantly increases.

A prevalent surface irregularity that afflicts an appreciable percentage of conventional data storage disks is generally referred to as an asperity. Asperities are isolated submicron-sized particles, typically comprising silicon carbide material, that are embedded in the disk substrate. No single mechanism has yet been identified as the source of such asperities, and it is believed that asperity defects arise from numerous sources. Such asperities are often large enough to interfere with the flight path of a typical slider/transducer assembly by impacting with the slider/transducer assembly at a very high velocity.

Further, asperities arising from the surface of a data storage disk are generally distributed in a highly random manner, and change in shape and size in response to changes in disk and ambient temperatures. A collision between a slider/transducer assembly and an asperity often renders the location of the asperity unusable for purposes of reading and writing information. Moreover, repeated contact between the slider/transducer assembly and asperity may cause damage of varying severity to the slider/transducer assembly.

Magneto-resistive (MR) transducers, for example, are particularly susceptible to interference from contact with asperities. It is well-known that MR transducers are very sensitive to variations in temperature, and are frequently used as temperature sensors in other applications. A collision between an MR transducer element and an asperity results in the production of heat, and a corresponding rise in transducer element temperature. Such transient temperature deviations are typically associated with an inability of the MR transducer element to read previously written data at the affected disk surface location, thereby rendering the stored information unrecoverable.

In the continuing effort to minimize head-to-disk clearance, manufacturers of disk drive systems recognize the importance of establishing a nominal head flyheight that is sufficient to avoid disk surface defects, such as asperities. A spacing tolerance is typically included within the nominal flyheight dimension for a given drive design in order to minimize the probability of contact between the slider/transducer and anticipated disk surface obstructions that may develop on the disk surface during and after manufacture.

Although the added spacing tolerance may indeed reduce the likelihood of head-to-disk contact, the resulting increase in head-to-disk spacing reduces the readback signal sensitivity of the transducer which impacts the degree to which the disk storage density may be increased. Further, adding a spacing tolerance to the flyheight specification across a family of common disk drives typically results in an unnecessarily large nominal flyheight for many of the common drives.

A number of screening approaches have been developed for use during disk drive manufacturing to identify heads that are flying with insufficient head-to-disk clearance. One such method for determining head-to-disk clearance is referred to as a Harmonic Ratio Flyheight (HRF) clearance test. The HRF test is a known method for measuring the flyheight of a slider/transducer assembly using a magnetic head-to-disk spacing signal. The HRF measurement method provides a continuous, instantaneous measurement of the ratio of two spectral lines in the spectrum of a readback signal. Both of the instantaneous spectral line amplitudes relate to the same volume element of the recording medium directly underneath the MR transducer. The HRF measurement method provides for the determination of the instantaneous head clearance with respect to the disk surface using a magnetic readback signal.

Although the HRF clearance test provides accurate head-to-disk spacing measurements, the HRF test method typically requires employment of a dedicated tester which may take several minutes to complete HRF testing of a disk drive. Additional complications arise if HRF measurements are to be made in the data zone rather than in the start/stop or landing zone. For example, a mechanical pusher may be required to position the heads at the outer disk diameter in the data zone, with HRF measurements being taken between two fixed motor speeds. These and other potential hardware and software complications associated with the HRF clearance test approach significantly reduce the attractiveness of implementing a fully autonomous in-situ HRF clearance testing capability within a direct access storage device.

There exists a keenly felt need in the data storage system manufacturing community for an apparatus and method for detecting low flying heads during disk drive manufacturing and, importantly, during subsequent use in the field. There exists a further need for an apparatus and method for detecting head-to-disk contact events so that surface defect locations may be identified and avoided. There exists yet a further need to provide such an apparatus and method which is suitable for incorporation into existing data storage systems, as well as into new system designs, and one that operates fully autonomously in-situ a data storage system. The present invention is directed to these and other needs.

SUMMARY OF THE INVENTION

The present invention is directed to an apparatus and method for detecting low flying read/write heads. In particular, the present invention is directed to an apparatus and method for detecting contact between an air bearing slider/transducer assembly and a surface feature developed on a surface of a data storage disk.

The apparatus includes a transducer disposed on an air bearing slider. An actuator is coupled to the slider/transducer assembly typically by employment of a head suspension assembly. A processor, in response to position error signals developed from servo information provided on the disk surface, moves the actuator and slider/transducer assembly to prescribed disk surface locations. The processor further processes non-repeatable position error signal values developed at a plurality of disk surface locations to detect occurrences of contact between the slider/transducer assembly and a surface feature arising from the disk surface.

Detecting occurrences of a head-to-disk contact generally involves acquiring position error signals from a first disk location and a second disk location using a particular transducer. The processor computes a power ratio value using a first power value and a second power value respectively derived from non-repeatable position error signals acquired from the first and second disk locations. The processor then compares the power ratio value with a power ratio threshold value, such that a power ratio value exceeding the power ratio threshold value indicates an occurrence of contact between the air bearing slider and a surface feature of the disk.

In accordance with one embodiment of the present invention, a first set of position error signals are acquired from an outer diameter disk location, and a second set of position error signals are acquired from an inner diameter disk location. The processor computes the power ratio value using a first power value and a second power value respectively derived from non-repeatable position error signals from the first and second sets of position error signals.

In accordance with another embodiment, a first set of position error signals are acquired from a location of the disk at which clearance between the air bearing slider and disk surface is at a minimum relative to other disk locations. A second set of position error signals are acquired from a location of the disk other than the disk location at which clearance between the air bearing slider and disk surface is at the minimum.

The power values computed by the processor represent a magnitude of a power spectrum associated with the non-repeatable position error signals acquired from each of the plurality of disk locations. The power values are associated with position error signal frequencies in excess of the servo frequency bandwidth. For example, the power values are associated with position error signal frequencies greater than approximately 1 kHz.

The head-to-disk contact detection methodology of the present invention may be implemented in-situ a data storage system. An in-situ head-to-disk contact detection capability provides for the identification of low flying heads during manufacturing screening and during normal field usage. The head-to-disk contact detection methodology of the present invention may be field upgradable in-situ a data storage system.

BRIEF DESCRIPTION OF THE DRAWINGS

FIG. 4 is a side plan view of a generic air bearing slider having one or more transducer elements mounted toward the trailing edge of the slider;

FIG. 5 is a bottom plan view of the slider shown in FIG. 4;

Figure 1:
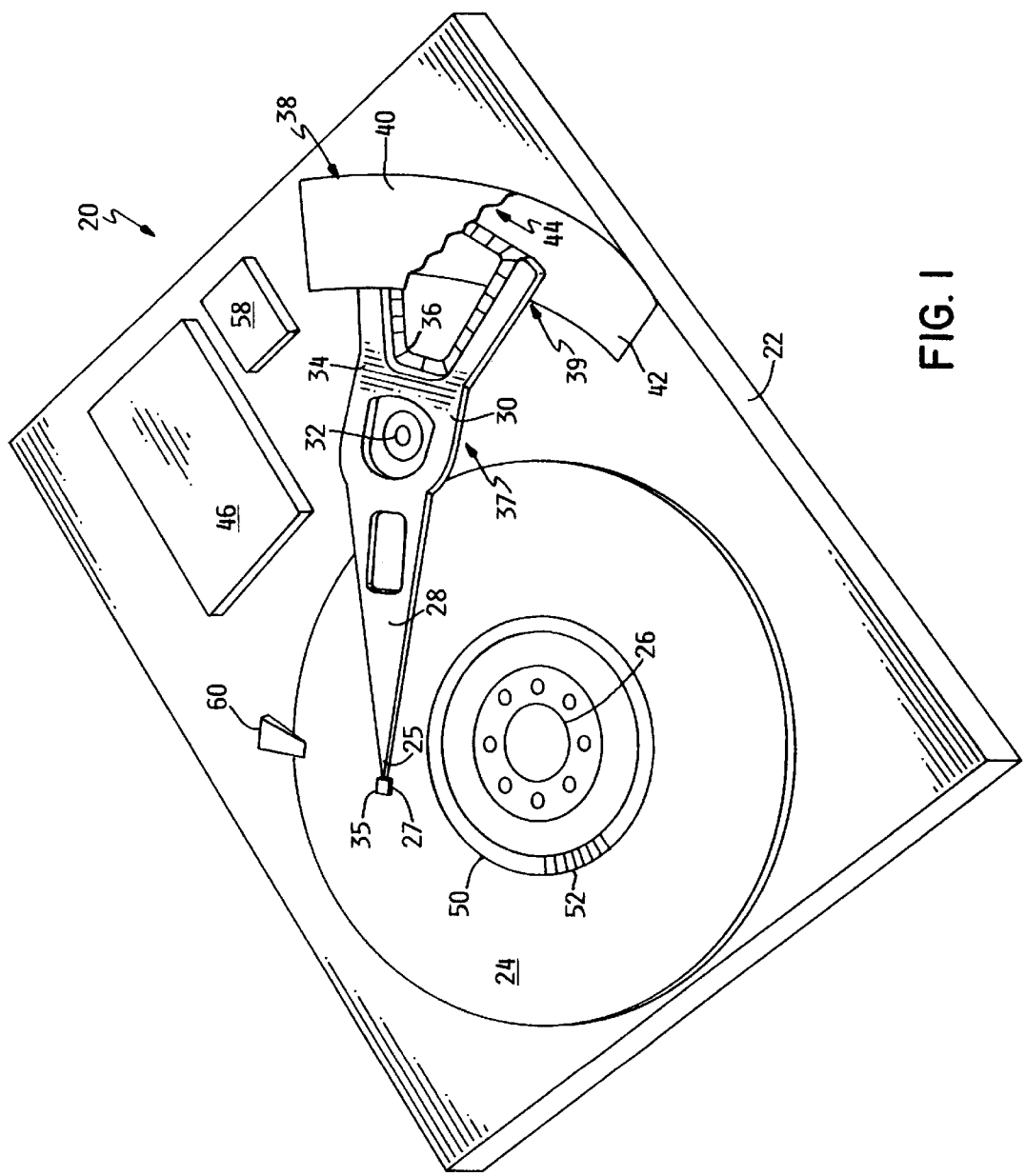
FIG. 1 is a top perspective view of a data storage system with its upper housing cover removed.

While the invention is amenable to various modifications and alternative forms, specifics thereof have been shown by way of example in the drawings and will be described in detail hereinbelow. It is to be understood, however, that the intention is not to limit the invention to the particular embodiments described. On the contrary, the invention is intended to cover all modifications, equivalents, and alternatives falling within the spirit and scope of the invention as defined by the appended claims.

DETAILED DESCRIPTION OF THE VARIOUS EMBODIMENTS

In the following description of the illustrated embodiments, references are made to the accompanying drawings which form a part hereof, and in which is shown by way of illustration, various embodiments in which the invention may be practiced. It is to be understood that other embodiments may be utilized, and structural and functional changes may be made without departing from the scope of the present invention.

A low flying read/write head detection system and methodology in accordance with the principles of the present invention provides for in-situ identification of heads which are flying with insufficient head-to-disk clearance during manufacturing screening and, importantly, during post-manufacturing use in the field. The head-to-disk contact detection approach in accordance with the principles of the present invention may be implemented using existing components of a data storage system, thereby requiring no additional hardware. As such, the low flying head detection methodology of the present invention may be implemented in existing and new data storage system designs, with simple modifications being made only to the software of the head positioning processor. Further, software embodying the head-to-disk contact detection methodology of the present invention may be downloaded into in-service data storage systems.

The position error signal is used to detect low flying heads, such as heads that intermittently contact the disk surface. In contrast to conventional approaches that use a magnetic readback signal to detect head-to-disk spacing (e.g., the HRF clearance test), use of the position error signal greatly simplifies the complexity of the software and hardware needed to detect low flying heads and head-to-disk contact events.

Further, a low flying head detection procedure according to the present invention may be performed during periods in which data is being read from, or written to, the data storage disk. Many data storage systems, for example, employ a servo processor for positioning the read/write heads and a separate data processor for coordinating the transfer of data between the data storage disks and the data channel. In such systems, servo processor resources may be used to perform a low flying head detection procedure during periods in which the data processor is actively coordinating data transfer operations.

In accordance with an embodiment of the present invention, position error signal measurement values are obtained for a given read/write head during several disk revolutions and stored in memory. The on-board processor of the data storage system separates raw PES readings into repeatable (i.e., synchronous) PES values and non-repeatable (i.e., non-synchronous) PES values. In general, most occurrences of intermittent contact between a head and a disk surface are non-synchronous or non-repeatable with respect to disk rotation. The PES values associated with the non-repeatable intermittent contact events for the read/write head, termed NRRO (non-repeatable runout) values, are used by the processor to calculate NRRO power values.

Large deviations in the NRRO power values evidence the occurrence of contact between the head and a feature on the surface of the disk. The NRRO power values are compared to a power ratio threshold value established for the data storage system typically at the time of manufacture. NRRO power values computed by the on-board processor for a given read/write head that exceed the power ratio threshold value indicate the occurrence of head-to-disk contact for the given head. The magnitude of a particular NRRO power value associated with a given head and disk location is proportional to the force of impact between the head and the implicated disk surface feature.

In one embodiment, NRRO power values are computed from PES signals respectively acquired from a first disk location, typically an outer diameter disk location, and a second disk location, typically an inner diameter disk location, using a particular read/write transducer. In another embodiment, NRRO power values are calculated from PES signals respectively acquired from a location of the disk at which clearance between the read/write head and disk surface is at a minimum relative to other disk locations, and from a location of the disk other than the disk location at which clearance between the read/write head and disk surface is at the minimum.

The processor computes a power ratio value using a first and second NRRO power values respectively derived from non-repeatable position error signals acquired from the two disk locations. The processor then compares the power ratio value with a power ratio threshold value. A power ratio value computed for a particular read/write head that exceeds the power ratio threshold value indicates an occurrence of contact between the read/write head and a surface feature of the disk.

In an alternative embodiment in which head flyheight is substantially uniform across the data zone, isolated surface defects, such as asperities, may be detectable using the position error signal. Detectability of such contact events in uniform flyheight drives is strongly dependent on the location of a surface defect relative to a position error signal sample. For example, and with reference to FIG. 13, a first asperity 304a is shown located on a portion of a disk surface 300 adjacent to, and later-in-time than, a first PES sample location 302a. Detecting the presence and location of asperity 304a may be difficult, if not impossible, because it is likely that any head roll modulation resulting from contact between the head and asperity 304a will attenuate to a non-detectable level during a time $T_1$ after the contact event. As such, asperity 304a will not likely cause modulation of the position error signal in a PES sample obtained when the head reaches PES sample location 302b after the duration of time defined by time $T_1$.

Figure 13:
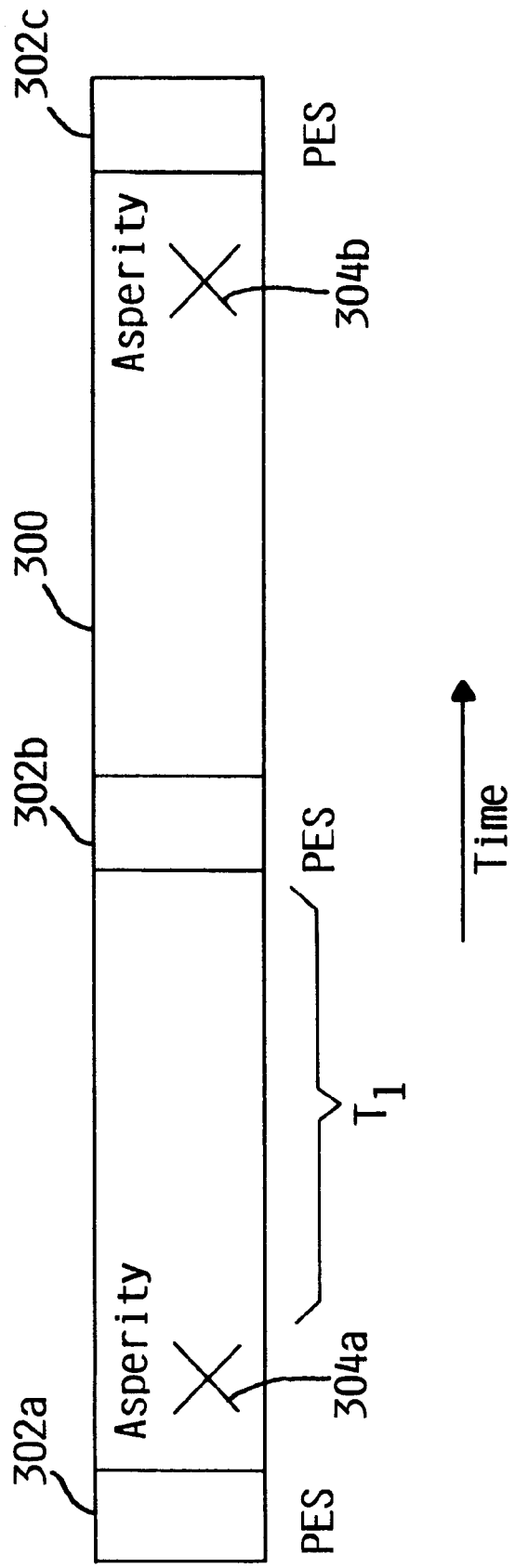
FIG. 13 is an illustration of a disk surface portion including a number of servo sectors from which position error signals may be developed, and a number of disk surface protuberances or asperities.

An asperity, such as asperity 304b, however, may be detectable using the position error signal. In general, an isolated asperity may be detectable if it is proximal to, and earlier-in-time than, a PES sample location. In FIG. 13, for example, asperity 304b may be detectable since roll modulation resulting from head contact with asperity 304b may be sufficiently present to cause PES modulation when the head reaches PES sample location 302c.

In the case of a uniform flyheight drive, position error signals are acquired by a given read/write head positioned at a particular disk location. The on-board processor computes NRRO power values using non-repeatable PES signal values acquired at the particular disk location, and compares the NRRO power values with a power threshold value or range of values. NRRO power values that exceed the power threshold value indicate the occurrence of contact between the read/write head and a surface feature at the particular disk location. As discussed previously, such a surface feature will be proximal to, and earlier-in-time than, a PES sample location from which an NRRO power value is derived. The power threshold value is typically established statistically through empirical analysis of a given disk drive design.

Having identified the presence of a disk surface defect using the head-to-disk disk contact detection approach in accordance with this embodiment, any data stored at the location of the defect may be moved, if possible, to another location on the disk surface. The location of the defect may then be identified as unusable so as to preclude subsequent head-to-disk contact events during continued disk drive system operation.

Figure 2:
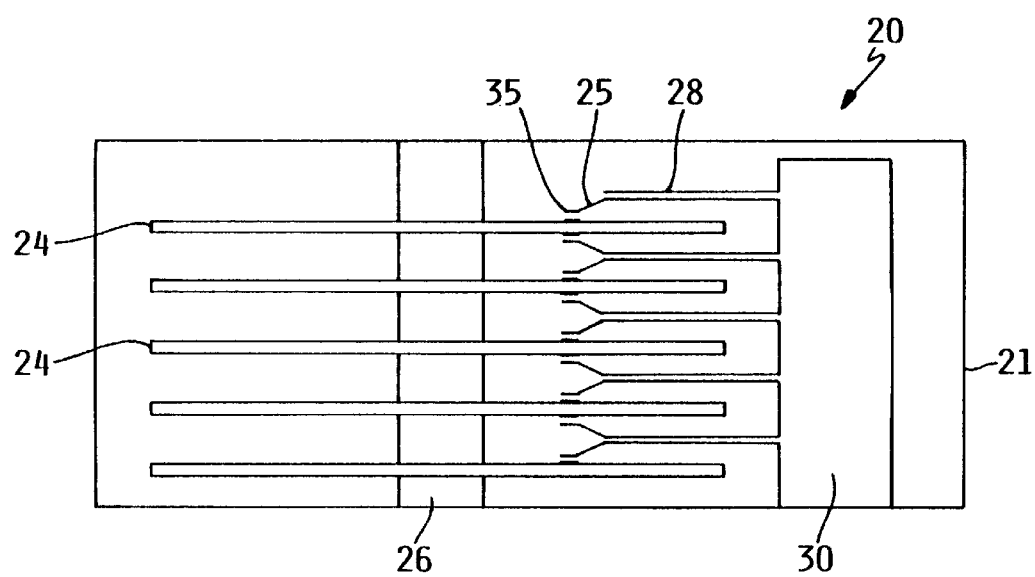
FIG. 2 is a side plan view of a data storage system comprising a plurality of data storage disks.

Referring to the drawings, and more particularly to FIGS. 1 and 2, there is illustrated a data storage system 20 within which the head-to-disk contact detection methodology of the present invention may be implemented. The data storage system 20, as is shown in FIG. 2, typically includes one or more rigid data storage disks 24 which are stacked coaxially in a tandem spaced relationship, and rotate about a spindle motor 26 at a relatively high rate of rotation. Each disk 24 is typically formatted to include a plurality of spaced concentric tracks 50, with each track being partitioned into a series of sectors 52 which, in turn, are further divided into individual information fields. One or more of the disks 24 may alternatively be formatted to include a spiraled track configuration.

An actuator 30 typically includes a number of interleaved actuator arms 28 with each arm having one or more transducer 27 and slider 35 assemblies mounted to a load beam 25 for transferring information to and from the data storage disks 24. The slider 35 is typically designed as an aerodynamic lifting body that lifts the transducer 27 off the surface of the disk 24 as the rate of spindle motor rotation increases and causes the transducer 27 to hover above the disk 24 on an air bearing produced by high speed of rotation of the disk 24. A conformal lubricant may alternatively be disposed on the disk surface 24 to reduce static and dynamic friction between the slider 35 and the disk surface 24.

The actuator 30 is typically mounted to a stationary actuator shaft 32 and rotates on the shaft 32 to move the actuator arms 28 into and out of the stack of data storage disks 24. A coil assembly 36, mounted to a coil frame 34 of the actuator 30, generally rotates within a gap 44 defined between the upper and lower magnet assemblies 40 and 42 of a permanent magnet structure 38 causing the actuator arms 28, in turn, to sweep over the surface of the data storage disks 24. The spindle motor 26 typically comprises a polyphase AC motor or, alternatively, a DC motor energized by a power supply 46 and adapted for rotating the data storage disks 24.

The coil assembly 36 and the upper and lower magnet assemblies 40 and 42 of the permanent magnet structure 38 operate in cooperation as an actuator voice coil motor 39 responsive to control signals produced by a controller 58. The actuator voice coil motor 39 produces a torquing force on the actuator coil frame 34 when control currents of varying direction and magnitude flow in the coil assembly 36 in the presence of a magnetic field produced by the permanent magnet structure 38. The torquing forces imparted on the actuator coil frame 34 cause corresponding rotational movement of the actuator arms 28 in directions dependent on the polarity of the control currents flowing in the coil assembly 36. A controller 58 typically includes control circuitry that coordinates the transfer of data to and from the data storage disks 24 and cooperates with the actuator voice coil motor 39 to move the actuator arms 28 and transducers 27 to prescribed track 50 and sector 52 locations when reading and writing data to and from the disks 24.

Figure 3:
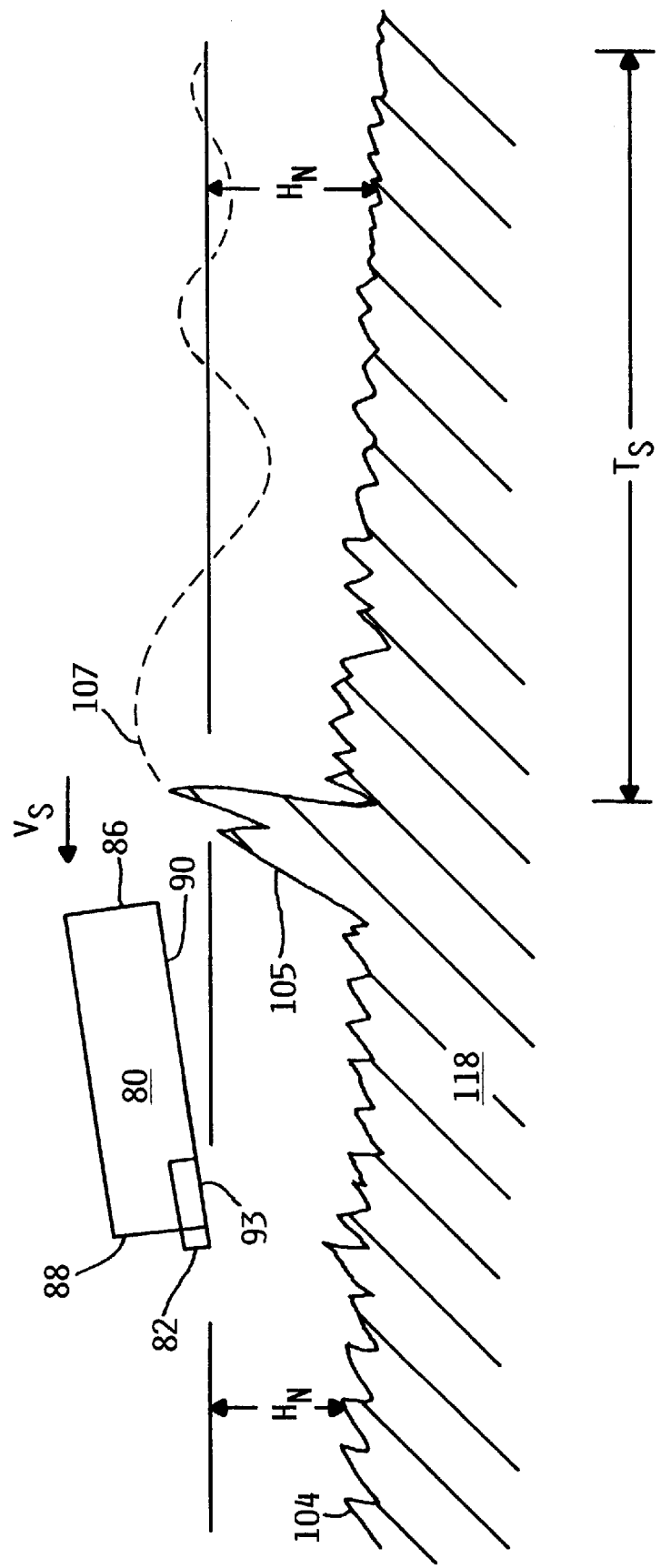
FIG. 3 is a partial sectional side view of an air bearing surface of a slider supported on an air bearing above a surface of a data storage disk, the surface of the disk including a defect or obstruction.

Referring now to FIG. 3, there is illustrated a sectional side view of an air bearing slider 80 which includes a lower surface 90 and a transducer element 82 mounted toward the trailing edge 88 of the air bearing surface 90. The surface 104 of data storage disk 118 is shown moving at a velocity, $V_s$, relative to the air bearing slider 80. A defect 105 is shown protruding upwardly from the surface 104 of the data storage disk 118. The defect 105 is generally representative of any disk surface defect or obstruction, but will be described hereinafter as an asperity 105.

It is known that asperities 105 typically arise from the surface 104 of a disk 118 in a highly randomized and unpredictable manner. Those skilled in the art can readily appreciate the advantages of preventing deleterious contact between a transducer element 82 and a disk surface 104 obstruction during data storage system activity, particularly when reading and writing information to the disk surface 104.

A magneto-resistive transducer element 82, for example, is particularly sensitive to contact with an asperity 105 or other obstruction due in part to its inherent sensitivity to temperature variations. Intermittent contact between an MR transducer element 82 and asperity 105 or other obstruction results in a temperature increase in the MR transducer element 82, and often renders the data written at the effective disk surface location unreadable or unrecoverable.

Head-to-disk disk contact events disrupt nominal operation of read/write transducers fabricated using other technologies. For example, a thin-film transducer element 82 is generally insensitive to temperature variations associated with asperity collisions. Many thin-film transducer elements 82 are configured to include write poles biased with a voltage potential and are mounted near the lower surface 90 and exposed to the disk surface 104. Intermittent contact between a thin-film transducer element 82 and an asperity 105 can result in arcing between the write poles and the disk surface 104. Such undesirable arcing frequently results in an inability to recover data previously written to the affected area of the disk surface 104.

Other air bearing slider configurations that incorporate optical fiber elements at a transducer element mounting location can also suffer varying degrees of performance degradation due to abrasions to the optical fiber probe element resulting from contact with an asperity 105.

It can be appreciated, therefore, that detecting and avoiding asperities and other obstructions arising from, or disposed on, the surface of a data storage disk 104 is necessary to ensure reliable and continuous operation of a disk drive system. In addition to the possibility of permanently losing data, repeated contact between a read/write head and disk surface asperity or defect can result in permanent damage to the air bearing slider, which may render the head and potentially the entire disk drive system unusable.

Still referring to FIG. 3, the data storage disk 118 typically rotates at a prescribed angular velocity, $\Omega_D$, typically on the order of 5,000 to 8,000 RPM, with the air bearing slider 80 remaining comparatively fixed with respect to the rapidly rotating disk surface 104. A typical head-to-disk contact event involves a collision between the lower surface 90 of the air bearing slider 80 and an asperity 105. In the embodiment of an air bearing slider 80 shown in FIG. 3, the air bearing slider 80 is oriented such that the lower surface 90 has a mean positive lateral pitch angle with respect to the surface 104 of the data storage disk 118. As such, contact between the air bearing slider 80 and surface asperity or obstruction is more likely to occur toward the trailing edge 88 of the slider 80.

It is noted that the read/write transducer elements 82 are shown positioned toward the rear of an air bearing pad 93. The edges of the air bearing pad 93, depending on the configuration of the lower surface 90, may constitute the lowest flying point of the slider 80 for a majority of the time because of roll modulation that occurs about the longitudinal axis of the slider 80. A typical read/write head, for example, may have a roll modulation that is typically on the order of 2–3 nanometers (nm) during normal track following operation. Further, the lateral offset distance between the contact points at the respective edges at the air bearing pad 93 and the head-to-disk suspension mounting point introduces a rotational moment. The rotational moment creates radial displacement motions of the head which are observable in the output signal produced by the PES demodulator, such as the demodulator 162 shown in FIG. 6.

In response to contact between an asperity 105 and the lower surface 90 of the slider 80, the slider 80 is displaced vertically with respect to the surface 104 of the disk 118. After the asperity 105 passes by the slider 80, the vertically displaced slider 80 follows a complex oscillatory trajectory 107 as it settles back to its nominal flyheight, $H_N$, over the disk surface 104. The contact between the asperity 105 and air bearing slider 80, and subsequent oscillatory settling of the slider 80, introduces energy into the head suspension assembly resonant frequencies. By appropriately detecting this added energy in the position error signal, head-to-disk contact events may be accurately identified.

FIG. 4 is an exaggerated side plan view of an air bearing slider 200 having one or more transducer elements 208 mounted toward the trailing edge 203 of the slider 200. FIG. 5 is a bottom plan view of the slider shown in FIG. 4. The air bearing slider 200 shown in FIGS. 4 and 5 is intended to represent a generic slider configuration for purposes of illustration. No particular flying characteristics or attributes are intended to be suggested or implied in FIGS. 4 and 5.

In the configuration shown in FIGS. 4 and 5, the air bearing slider 200 includes a leading edge 205 and a trailing edge 203. A pair of front air bearing surfaces or pads 204, 206 are disposed on a lower surface 207 of the slider 200. The front air bearing pads 204, 206 are positioned toward the leading edge 205 and along opposing sides of the slider 200. Positioned toward the trailing edge 203 of the slider 200 and centered along the longitudinal axis of the slider 200 is a rear air bearing surface 202. One or more transducers 208 are mounted behind the rear air bearing surface 202.

The air bearing slider 200 depicted in FIGS. 4 and 5 has a length (L) of approximately 3 mm, a height (H) of approximately 0.5 mm, and a width ($W_2$) of approximately 2.5 mm The width ($W_1$) of the transducer assembly 202 is approximately 0.3 mm. The air bearing slider 200 is oriented such that its lower surface 207 has a mean positive lateral pitch angle, $\theta$, of approximately 0.2 to 0.3×10⁻ radians with respect to the surface 201 of the data storage disk.

Figure 6:
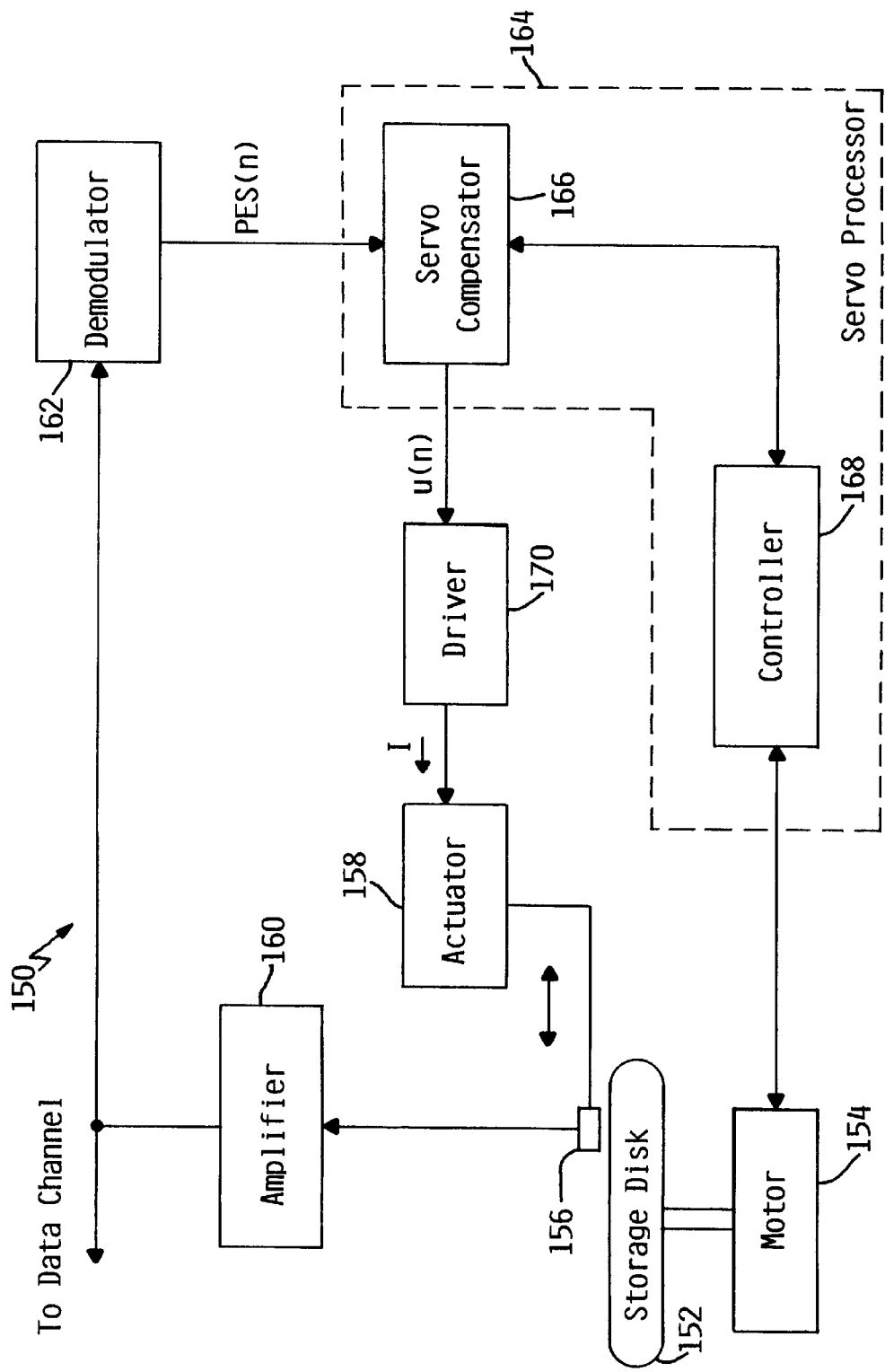
FIG. 6 is a block diagram of an embodiment of a read/write head positioning control apparatus of a data storage system.

Turning now to FIG. 6, there is illustrated a system block diagram showing several components of a system 150 for positioning a read/write head over specified locations of a data storage disk surface and for performing the head-to-disk contact detection procedure of the present invention. A read/write head 156 is shown positioned above a data storage disk 152. An actuator 158, in response to current control signals produced by a driver 170, moves the read/write head 156 to prescribed track and sector locations when transferring data to and from the data storage disk 152. A motor 154 rotates the disk 152 at a prescribed rate in response to motor control signals produced by a controller 168 of a servo processor 164.

Signals read from a servo pattern embedded or otherwise provided on the disk 152 are transmitted from the read/write head 156 to an amplifier 160. The servo signals are then transmitted to a demodulator 162 of the servo processor 164 and to a data channel (not shown). The demodulator 162 computes an instantaneous position error signal using the servo signals received from amplifier 160, and produces and output signal, PES(n), where n represents the sector index. A servo compensator 166 of the servo processor 164 uses the PES(n) signal in a servo algorithm to produce a control signal, u(n), which is converted to a control current, I, by the driver 170. The actuator 158, in response to the control current, I, moves the read/write head 156 to a specified location above the disk 152.

The efficacy of using the position error signal to detect excessively low flying heads and resulting excessive intermittent contact with the disk surface was verified by the inventors through experimentation. The test apparatus used in the experiment included a 3.5 inch disk drive system, a small vacuum chamber, and a test fixture which included hardware and software for controlling the disk drive unit and for collection data via a SCSI bus.

The flyheight of the heads was artificially adjusted during the experiment by adjusting the pressure in the vacuum chamber during drive operation. A low flying head was initially identified in the drive by measuring the flying height for all heads at several different vacuum levels using other means. One such measuring approach involves the use of a general error measurement facility which is provided in the recording channel that allows for the analysis of certain magnetic signals and transitions of magnetic signals.

It was possible to estimate head flyheight in the test drive with a reasonable degree of accuracy due to the expected linear change in head flying height as a function of pressure for the type of air bearing used in the test drive. A linear change in flying height as a function of pressure is generally expected for negative pressure air bearings of this type. This characteristic has been experimentally verified on several occasions.

It is to be understood that the head-to-disk contact detection methodology of the present invention does not require nor rely on the existence of a linear relationship between head flyheight and air bearing pressure. As was indicated above, the test drive used to verify the efficacy of the low flying head detection approach of the present invention included heads that demonstrate a linear change in flying height as a function of air bearing pressure.

Because the sensitivity of flyheight to pressure is a constant for the test drive, it was only necessary to determine the take-off height for the test drive in order to find the available head-to-disk clearance for any given head. The take-off height was found to be 12 nm, with a 1 nm standard deviation for the test drive based on measurements performed during mechanical integration. Given this information, the head-to-disk clearance was estimated with some degree of certainty.

Figure 14:
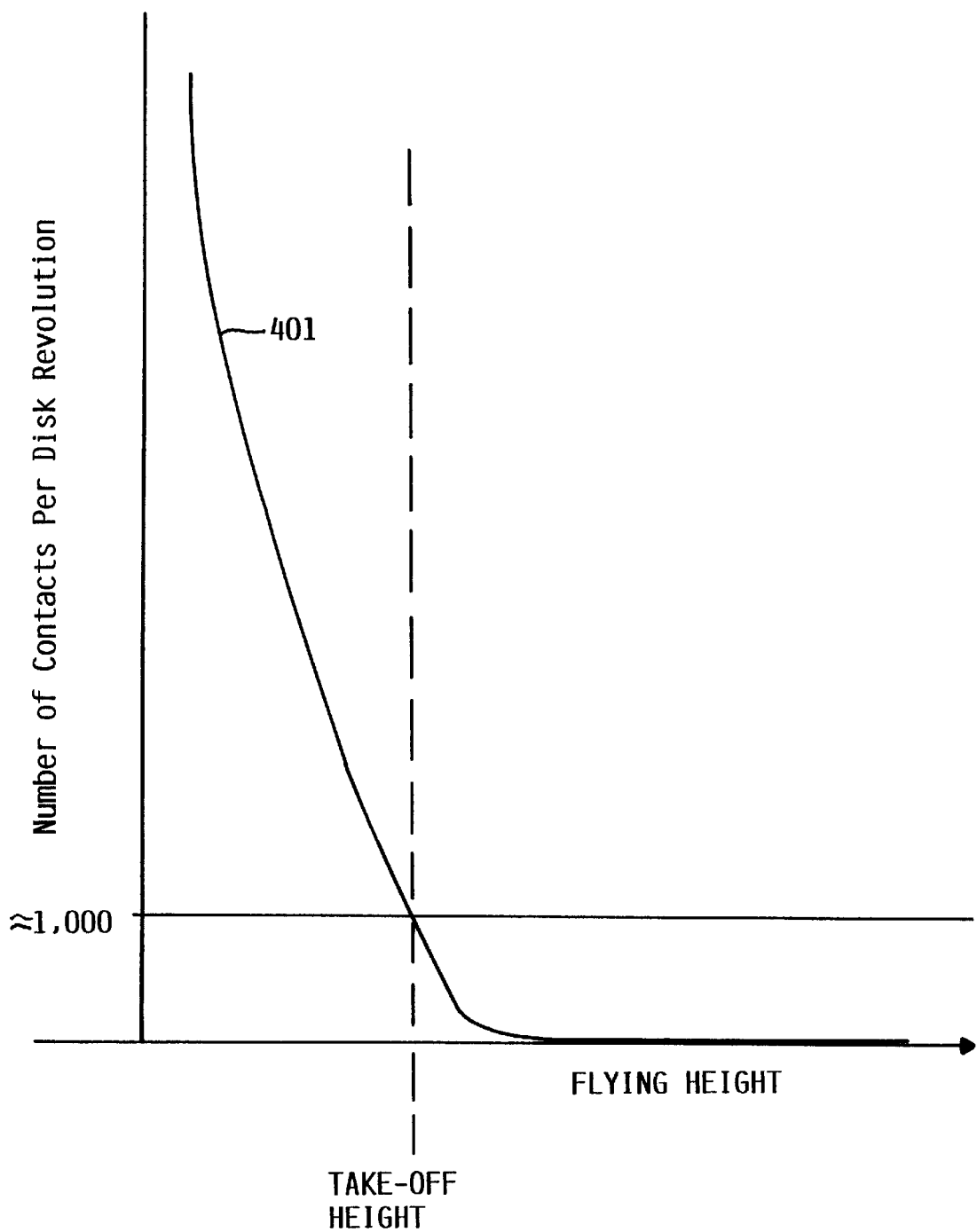
FIG. 14 is a graph illustrating head flying height as a function of the number of head-to-disk contacts per disk revolution for use in determining the take-off height of a head.

The head-to-disk clearance in the context of this illustrative example represents the difference between the flyheight of a head and the take-off height. FIG. 14 is a graphical showing of a typical curve 401 which may be used to derive the take-off height associated with a particular disk surface. The take-off height may be roughly described as the slider flying height at which the transition between sliding and flying occurs.

In FIG. 14, for example, the solid curve 401 indicates the number of head-to-disk contacts per disk revolution at different slider flying heights. Contacts may be measured by using well-known acoustic emission techniques. When starting at some large flying height and gradually decreasing the flying height, it will be observed that the number of contacts dramatically declines at some point. The "knee" of the head-to-disk contact curve, which in this case occurs approximately where the number of contacts exceed 1,000, is defined as the take-off height.

Figure 7:
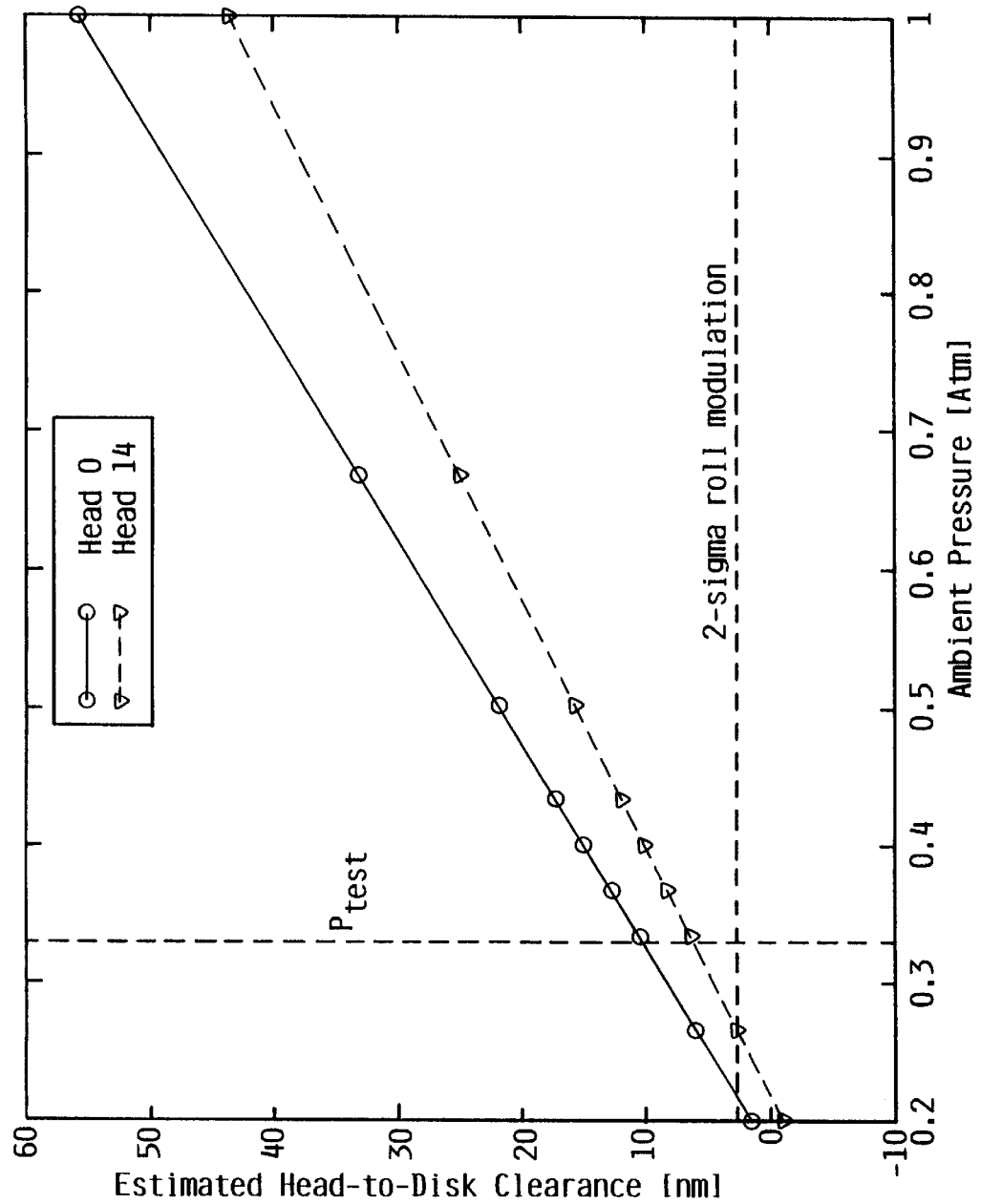
FIG. 7 graphically characterizes head-to-disk clearance as a function of ambient pressure for two heads (heads 0 and 14) of a head suspension assembly positioned at an inner diameter location of a data storage disk.
Figure 8:
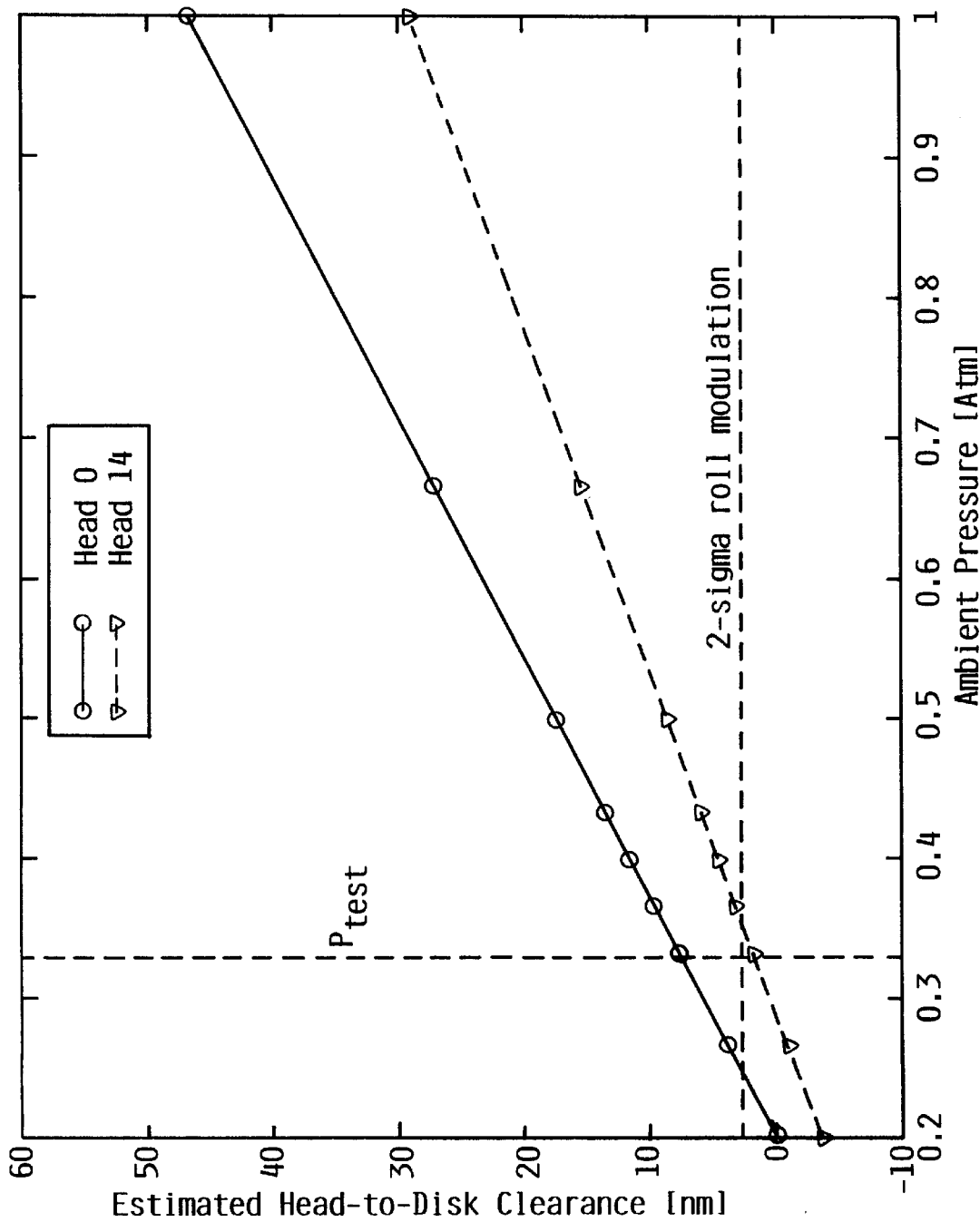
FIG. 8 graphically characterizes head-to-disk clearance as a function of ambient pressure for the two heads (heads 0 and 14) characterized in FIG. 7 positioned at an outer diameter location of the data storage disk.
Figure 9:
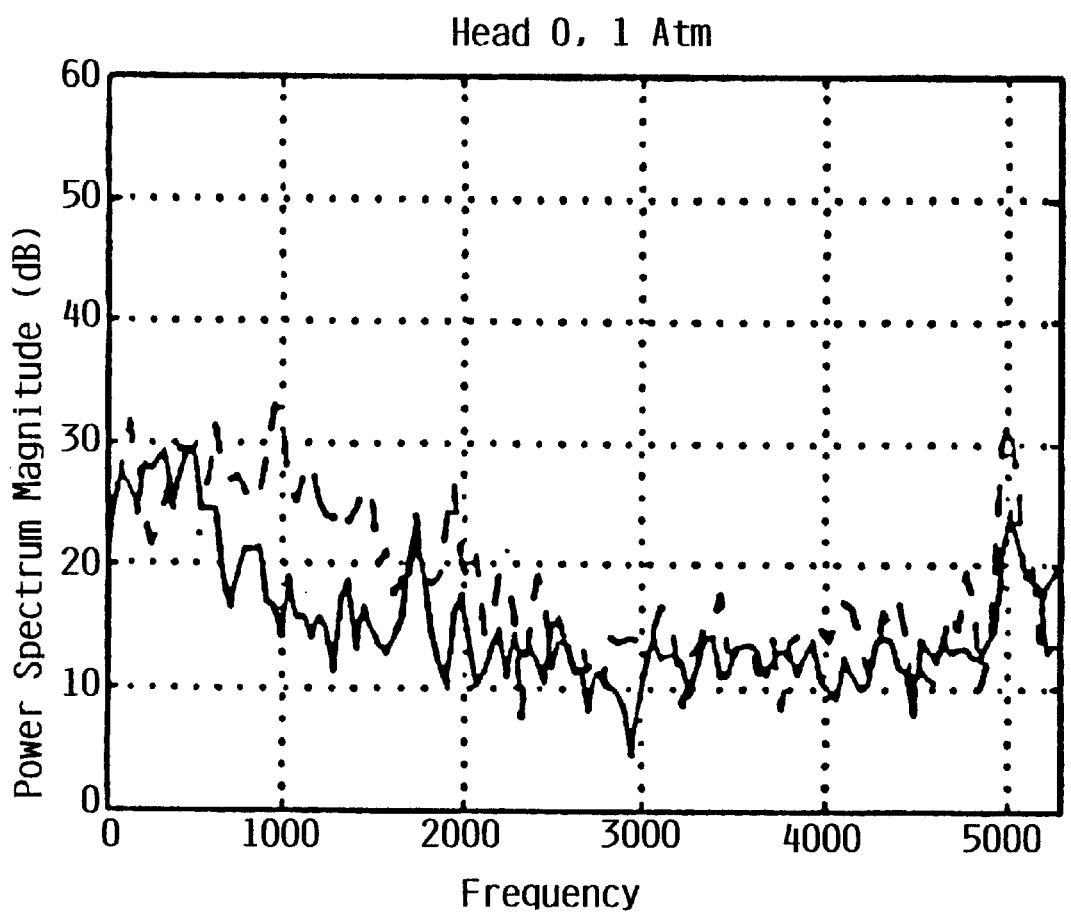
FIG. 9 is a plot of power spectrum magnitude as a function of frequency at an ambient pressure of 1 Atm derived from non-repeatable position error signals acquired at inner and outer disk diameter locations using one of the heads (head 0) characterized in FIGS. 7 and 8.
Figure 10:
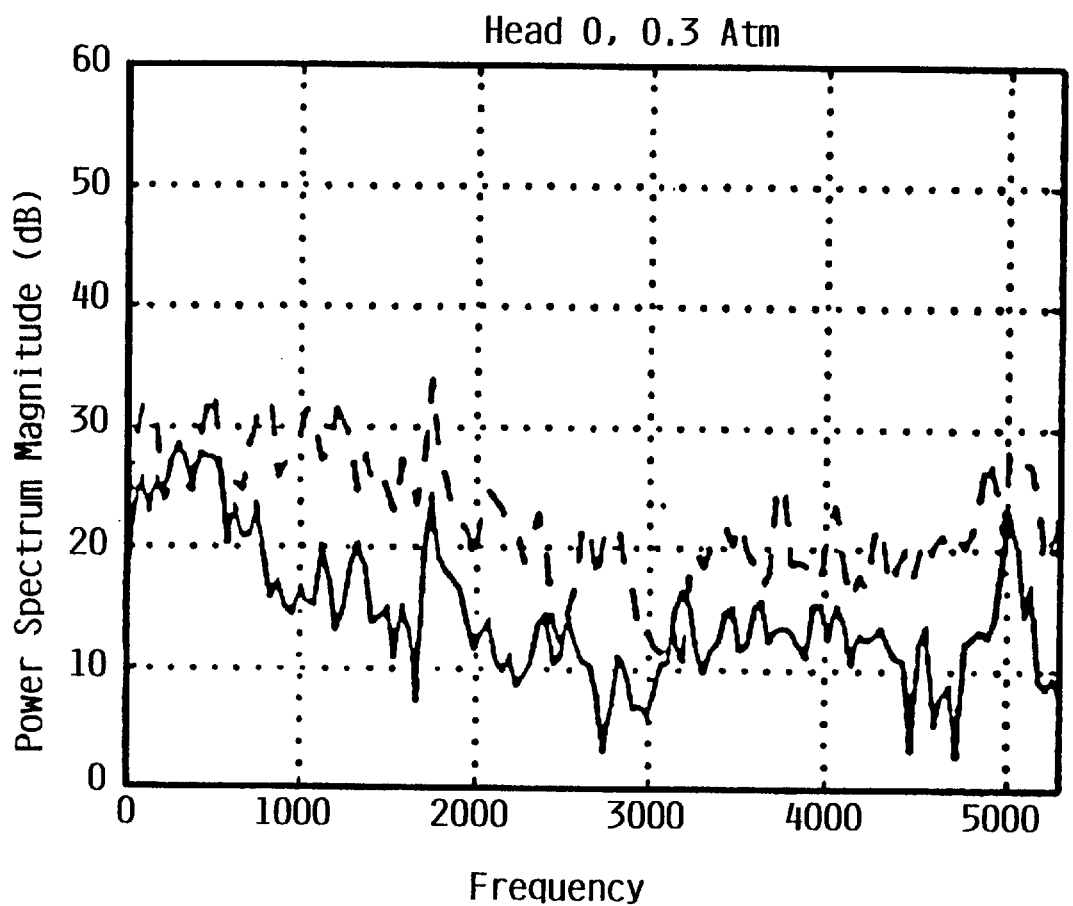
FIG. 10 is a plot of power spectrum magnitude as a function of frequency at an ambient pressure of 0.33 Atm derived from non-repeatable position error signals acquired at inner and outer disk diameter locations using one of the heads (head 0) characterized in FIGS. 7 and 8.
Figure 11:
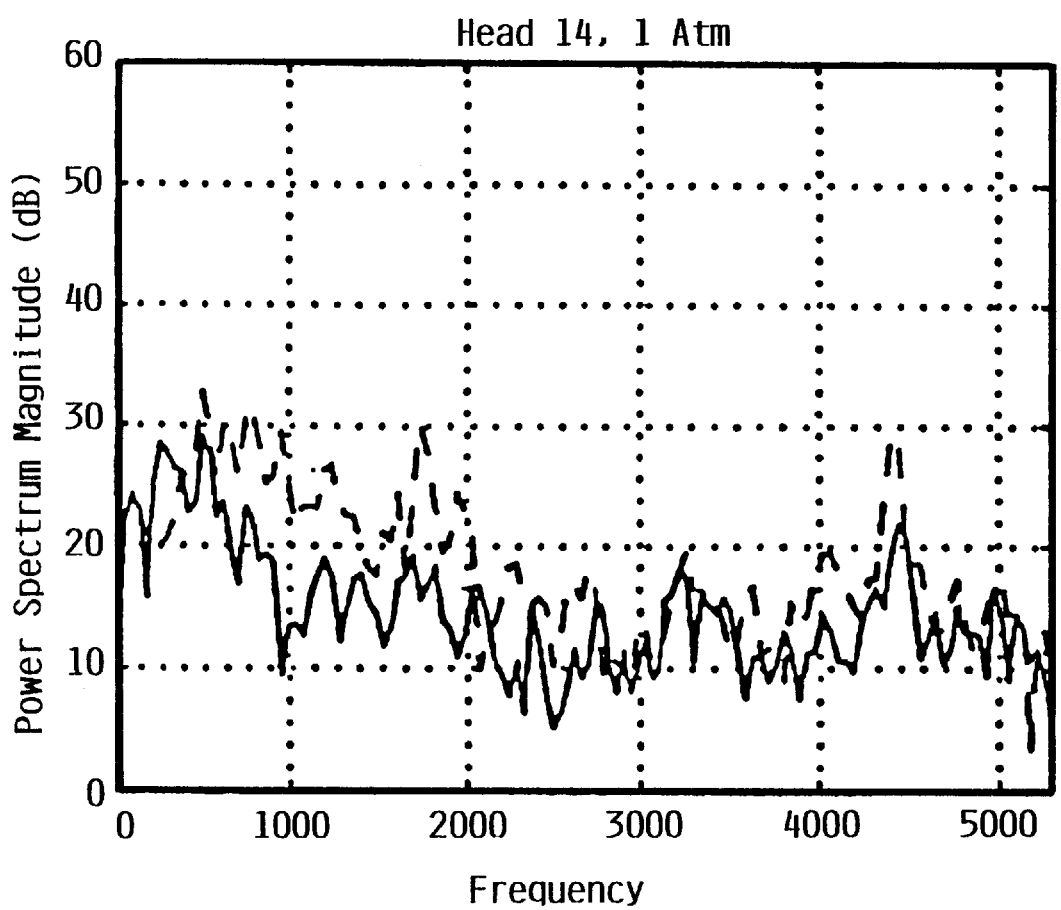
FIG. 11 is a plot of power spectrum magnitude as a function of frequency at an ambient pressure of 1 Atm derived from non-repeatable position error signals acquired at inner and outer disk diameter locations using the other one of the heads (head 14) characterized in FIGS. 7 and 8.
Figure 12:
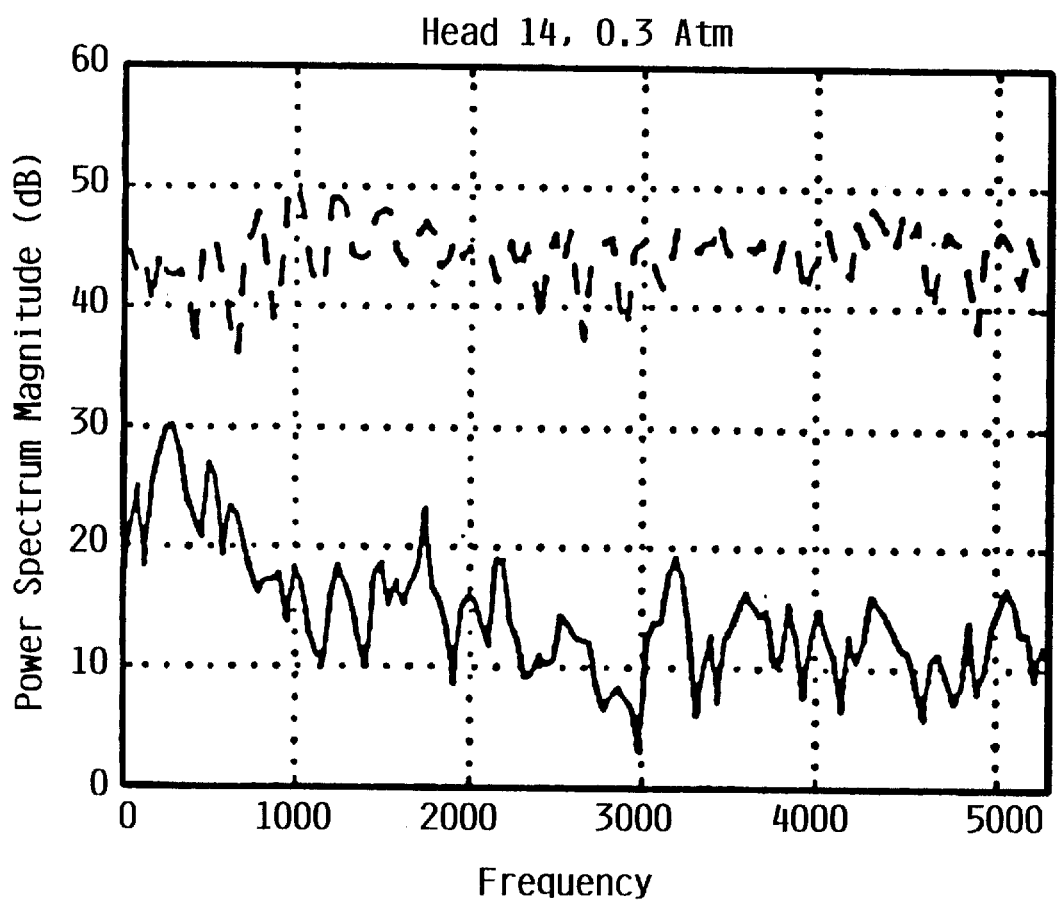
FIG. 12 is a plot of power spectrum magnitude as a function of frequency at an ambient pressure of 0.33 Atm derived from non-repeatable position error signals acquired at inner and outer disk diameter locations using the other one of the heads (head 14) characterized in FIGS. 7 and 8.

FIG. 7 is a plot of estimated head-to-disk clearance as a function of ambient pressure for heads 0 and 14 of the test drive positioned at the inner diameter of the disk. FIG. 7 thus indicates the available head-to-disk clearance at the inner diameter of the disk. The available head-to-disk clearance at the outer diameter of the disk is depicted in FIG. 8. The flying height for head 0 was found to be approximately equal to the average flying height for all heads. Head 14, as can be seen in FIGS. 7 and 8, was a low flying head and was found to have a flyheight lower than that of head 0 and lower than the average flyheight of all heads.

The roll modulation for all heads was found to have a standard deviation of approximately 1.3 nm. The horizontal dashed line shown in FIGS. 7 and 8, which is placed on the graph at +2-sigma or 2.6 nm, represent this roll modulation. The intersection of the head clearance lines with the horizontal dashed line indicates the ambient pressure at which significant head-to-disk contact occurred. A vertical dashed line, designated at $P_{test}$, is located at a pressure of 0.33 atmospheres (Atm) to indicate the test pressure used to compare the frequency spectra for the two heads, which will be discussed in reference to FIGS. 9–12.

It can be seen from FIG. 8 that head 14 experiences significant contact with the disk surface at the outer diameter of the disk. At the inner diameter, however, contact between head 14 and the disk surface is unlikely to occur, as can be seen from FIG. 7. This difference in head-to-disk contact characteristics at the inner and outer diameter of the disk surface is a natural consequence of the radial flying height profile used in the test drive. More particularly, the flying height is, by design, lower at the outer diameter than at the inner diameter of the disk.

During the experiment, the test drive was placed in the vacuum chamber and was set to track-following mode. The PES readings for ten consecutive disk revolutions at an inner diameter location (i.e., track 8,160) and an outer diameter track location (i.e., track 20) were made for different heads in the drive. The pressure within the chamber was reduced to produce lower head flyheights. Data points were taken at 1, 0.67, 0.5, 0.43, 0.4, 0.37, 0.33, 0.27, and 0.2 Atm. The PES readings were separated into repeatable PES (RRO) and non-repeatable PES (NRRO) readings. Intermittent contact between a head and a disk surface is typically non-synchronous or non-repeatable with respect to disk rotation. Therefore, these events were characterized as NRRO events.

Power spectral density data derived using heads 0 and 14 at inner and outer diameter disk locations for two chamber pressure levels is shown in FIGS. 9–12. An analysis of the frequency spectra of the NRRO readings reveals that the spectra are richer at lower ambient chamber pressures (i.e., lower head flyheights) and have a larger power component as compared to corresponding frequency spectra at normal ambient pressure (i.e., nominal flyheight). It is noted that most of this power is concentrated beyond the servo bandwidth of approximately 600–700 Hz. The NRRO power is also consistently greater at the outer diameter location than at the inner diameter location at any given pressure level. It is believed that this difference results from a greater frequency of intermittent contact between a head and disk surface at the outer diameter, where, for the test drive, the flying height is designed to be lower than at the inner diameter.

Interestingly, it was found that test drives that had sliders which flew higher at the outer diameter than at the inner diameter had NRRO power readings that were larger at the inner diameter than at the outer diameter. This difference in NRRO power was initially misinterpreted as spindle motor noise. The inventors have subsequently determined, as is supported by the empirical data presented in the FIGS. 7–12, that this difference in NRRO power at inner and outer diameters is flying height related. In general, the lower the flying height, the greater the chance of head-to-disk contact which contributes to the increase in NRRO power.

Equation [1] below characterizes NRRO power at a certain cylinder for a given head as the sum of the square of the NRRO for a number of sampled servo sectors (N):

$$P(NRRO, head, cylinder) = \sum_{1}^{N} NRRO(head, cylinder, N)^2 \quad [1]$$

One normalized measure for determining the relative flyheight difference is in the form a ratio, $R_{(head)}$, of $P_{(nrro, head, OD)}$ and $P_{(nrro, head, ID)}$. This ratio is expressed in algebraic terms in Equation [2] below:

$$R(head) = \frac{P(NRRO, head, OD)}{P(NRRO, head, ID)} \qquad [2]$$

Measurements obtained using the test drive provide for the following NRRO power ratios for heads 0 and 14 at chamber pressure levels of 1 and 0.33 Atms:

TABLE 1

NRRO-Power Ratio Data

| Pressure | Head 0 | Head 14 |
|---|---|---|
| 1 Atm. | 2.46 | 1.97 |
| 0.33 Atm. | 4.90 | 595.61 |

The NRRO power values provided in Table 1 above demonstrate that head 0 is flying correctly at both nominal and reduced flyheights. Head 14, on the other hand, experiences a large amount of intermittent contact with the disk at the lower flyheight (i.e., 0.33 Atm). The data plotted in FIG. 8 confirms that the cause of the large amount of intermittent head-to-disk contact at lower pressures is low head flyheight.

The intermittent disk contact experienced at 0.33 Atms results from the reduced clearance for head 14 which sporadically falls to zero due to roll modulation displacement. This condition leads to the complicated slider motions that produce significantly higher NRRO power at the outer disk diameter as compared to the inner disk diameter where intermittent contact is not expected, as is demonstrated in FIG. 7. The correlation between the NRRO power ratio and flyheight is dramatic, and provides a measurable indication of low head flyheight.

The NRRO power ratio can easily be determined in-situ by the servo processor of the data storage system, such as that depicted in FIG. 6. Position error signal measurement values for several revolutions may be stored in memory. The processor may then calculate the NRRO and perform the calculations implicated in Equations [1] and [2] above. Any large deviation in the NRRO power ratios may be compared against a threshold value to detect low head flyheight. In the experiments, the ambient pressure of the disk drive was lowered to artificially simulate a low flying head environment. Similar NRRO power ratios would also be expected if any of the heads in a data storage system was flying too low under normal operating conditions.

The experimental measurements indicate that low head flying height has a detrimental effect on the position error signal. This effect could cause problems while performing servo writing or during normal drive operation. By increasing the pressure within the drive during servo writing or error recovery, for example, better performance may be realized. Flying height may also be increased using argon as a substitute for air in the disk drive.

The head-to-disk contact detection approach of the present invention, as previously discussed, requires no additional hardware to implement in existing and future data storage systems. The servo processor software may be modified to effect sampling of the position error signal at the appropriate sampling rate and to perform the computations implicated in Equations [1] and [2] above. The servo processor may then perform a comparison of the resultant NRRO power ratios with one or more threshold values to verify detection of a low flying head and a head-to-disk contact event.

The location of the disk surface identified as precipitating a head-to-disk contact event may be tagged as unusable for purposes of future data storage and subsequently avoided. Any data previously written to the affected location may be moved to a defect-free location as a preventative measure. It is noted that modifications to the servo processor code may easily be downloaded to a disk drive system in the field, so that such systems may perform in-situ detection of low flying heads in a manner described hereinabove.

Implementing a head-to-disk contact detection system and methodology in accordance with the principles of the present invention may also obviate the need for a spacing tolerance which, as discussed in the Background of the Invention, represents a worst case flyheight for a family of common disk drive systems. Rather than building in a spacing tolerance to account for disk surface smoothness variations, a disk drive system employing the head-to-disk contact detection approach of the present invention may be designed to have an average head flyheight lower than a worst case flyheight.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of detecting contact between an air bearing slider and a surface feature developed on a surface of a magnetic data storage disk, comprising:

acquiring a first set of position error signal (PES) values developed at a first disk location using a transducer provided on the air bearing slider;

acquiring a second set of PES values developed at a second disk location using the transducer;

computing a first power value using non-repeatable PES values of the first set of PES values;

computing a second power value using non-repeatable PES values of the second set of PES values;

computing a power ratio value using the first and second power values; and comparing the power ratio value with a power ratio threshold value, whereby the power ratio value exceeding the power ratio threshold value indicates an occurrence of contact between the air bearing slider and the surface feature of the disk.

2. The method of claim 1, wherein:

acquiring the first set of PES values comprises acquiring PES values developed at an outer diameter disk location; and acquiring the second set of PES values comprises acquiring PES values developed at an inner diameter disk location.

3. The method of claim 1, wherein:

acquiring the first set of PES values comprises acquiring PES values developed at an outer diameter disk location; and acquiring the second set of PES values comprises acquiring PES values developed at a disk location between the outer diameter disk location and an inner diameter disk location.

4. The method of claim 1, wherein:

acquiring the first set of PES values comprises acquiring PES values developed at an inner diameter disk location; and acquiring the second set of PES values comprises acquiring PES values developed at a disk location between the inner diameter disk location and an outer diameter disk location.

5. The method of claim 1, wherein:

acquiring the first set of PES values comprises acquiring PES values developed at a disk diameter location at which clearance between the air bearing slider and disk surface is at a minimum relative to other disk diameter locations; and acquiring the second set of PES values comprises acquiring PES values developed at a disk location other than the disk diameter location at which clearance between the air bearing slider and disk surface is at the minimum.

6. The method of claim 1, wherein the respective acquiring, computing, and comparing steps are performed using each of a plurality of transducers.

7. The method of claim 1, wherein the first and second power values represent a magnitude of a power spectrum associated with the non-repeatable PES values of the first and second sets of PES values, respectively.

8. The method of claim 7, wherein the first and second power values are associated with PES frequencies in excess of a servo band of frequencies associated with the data storage disk.

9. The method of claim 7, wherein the first and second power values are associated with PES frequencies greater than approximately 1 kHz.

10. The method of claim 1, wherein the respective acquiring, computing, and comparing steps are performed in-situ a data storage system.

11. An apparatus provided in a data storage system for detecting head-to-disk contact events, comprising:

a data storage disk;

a transducer, provided on an air bearing slider, for transferring data to and from the disk;

an actuator for providing relative movement between the slider and the disk; and a processor that controls movement of the actuator in response to position error signals developed from servo information provided on the disk, the processor deriving non-repeatable position error signal values (PES values) developed at a plurality of disk locations and using the non-repeatable PES values to detect an occurrence of contact between the slider and a surface feature of the disk.

12. The apparatus of claim 11, wherein the processor uses the non-repeatable PES values developed at an outer diameter disk location and an inner diameter disk location to detect the occurrence of contact between the slider and the surface feature.

13. The apparatus of claim 11, wherein the processor uses the non-repeatable PES values developed at a disk location at which clearance between the air bearing slider and a surface of the disk is at a minimum relative to other disk locations and non-repeatable PES values developed at a disk location other than the disk location at which clearance between the air bearing slider and disk surface is at the minimum to detect the occurrence of contact between the slider and the surface feature.

14. The apparatus of claim 11, wherein the processor uses a power ratio threshold value and the non-repeatable PES values to detect the occurrence of contact between the slider and the surface feature of the disk.

15. The apparatus of claim 11, wherein the non-repeatable PES values are associated with PES frequencies in excess of a servo band of frequencies associated with the data storage disk.

16. The apparatus of claim 11, wherein the non-repeatable PES values are associated with PES frequencies in excess of approximately 1 kHz.

17. The apparatus of claim 11, wherein the processor computes a first power value using a first set of non-repeatable PES values derived at a first disk location and a second power value using a second set of non-repeatable PES values derived at a second disk location, computes a power ratio value using the first and second power values, and compares the power ratio value with a power ratio threshold value, whereby the power ratio value exceeding the power ratio threshold value indicates an occurrence of contact between the air bearing slider and the surface feature of the disk.

18. The apparatus of claim 17, wherein the first disk location represents a location of the disk at which clearance between the air bearing slider and a surface of the disk is at a minimum relative to other disk locations, and the second disk location represents a location of the disk other than the disk location at which clearance between the air bearing slider and disk surface is at the minimum.

19. The apparatus of claim 11, wherein the apparatus for detecting head-to-disk contact events is provided in-situ the data storage system.

20. A method of detecting contact between an air bearing slider and a surface of a magnetic data storage disk, comprising:

acquiring position error signals from a first disk location and a second disk location using a transducer integral with the air bearing slider;

computing a power ratio value using a first power value and a second power value respectively derived from non-repeatable position error signals acquired from the first and second disk locations; and comparing the power ratio value with a power ratio threshold value, whereby the power ratio value exceeding the power ratio threshold value indicates an occurrence of contact between the air bearing slider and a surface feature of the disk.

21. The method of claim 20, wherein:

acquiring the position error signals from the first disk location comprises acquiring the position error signals from an outer diameter disk location; and acquiring the position error signals from the second disk location comprises acquiring the position error signals an inner diameter disk location.

22. The method of claim 20, wherein:

acquiring the position error signals from the first disk location comprises acquiring the position error signals from a location of the disk at which clearance between the air bearing slider and disk surface is at a minimum relative to other disk locations; and acquiring the position error signals from the second disk location comprises acquiring the position error signals from a location of the disk other than the disk location at which clearance between the air bearing slider and disk surface is at the minimum.

23. The method of claim 20, wherein the first and second power values represent a magnitude of a power spectrum associated with the non-repeatable position error signals acquired from the first and second disk locations, respectively.

24. The method of claim 23, wherein the first and second power values are associated with position error signal frequencies in excess of a servo band of frequencies associated with the data storage disk.

25. The method of claim 23, wherein the first and second power values are associated with position error signal frequencies in excess of approximately 1 kHz.

26. The method of claim 20, wherein the respective acquiring, computing, and comparing steps are performed in-situ a data storage system.

* * * * *